United States Patent [19]
Stevens

[11] 3,731,493
[45] May 8, 1973

[54] WATER REPELLENT SAND

[75] Inventor: Clarence L. Stevens, Hampton, Va.

[73] Assignee: W. Gary Archer, Richmond, Va.

[22] Filed: Apr. 26, 1971

[21] Appl. No.: 137,343

[52] U.S. Cl. ........................................61/35, 52/169
[51] Int. Cl. ...............................................E02d 3/00
[58] Field of Search ......................61/35, 36; 52/169; 117/100 S

[56] References Cited

UNITED STATES PATENTS

| | | | |
|---|---|---|---|
| 3,411,939 | 11/1968 | Hunter et al. | 117/100 S X |
| 3,218,186 | 11/1965 | De Vries | 117/100 S X |
| 3,130,070 | 4/1964 | Potters et al. | 117/100 S |

*Primary Examiner*—Reinaldo P. Machado
*Assistant Examiner*—Philip C. Kannan
*Attorney*—Misegades & Douglas

[57] ABSTRACT

Earth-supported layer of water repellent sand for moisture control, the layer of sand disposed in bulk over a section of ground, the upper surface of the sand extending above the residual ground water level and being essentially level and smooth throughout, and the sand having each particle thereof essentially coated with a layer of silicone resin for eliminating the characteristic of capillary action. Where the sand is placed by blowers or the like in crawl spaces or under houses and other edifices, the moisture level under such edifices is maintained substantially in a dry condition. The sand may be blown into place and the silicone resin may be applied by spraying or blowing simultaneously with the blowing of the sand into the space, or the sand may be separately treated with silicone resin and dried, as above, and then blown under houses or edifices. The moisture control provided by the water repellent sand in part provides an insulating structure layer for eliminating heat loss into cool and damp ground.

2 Claims, 1 Drawing Figure

Patented May 8, 1973
3,731,493
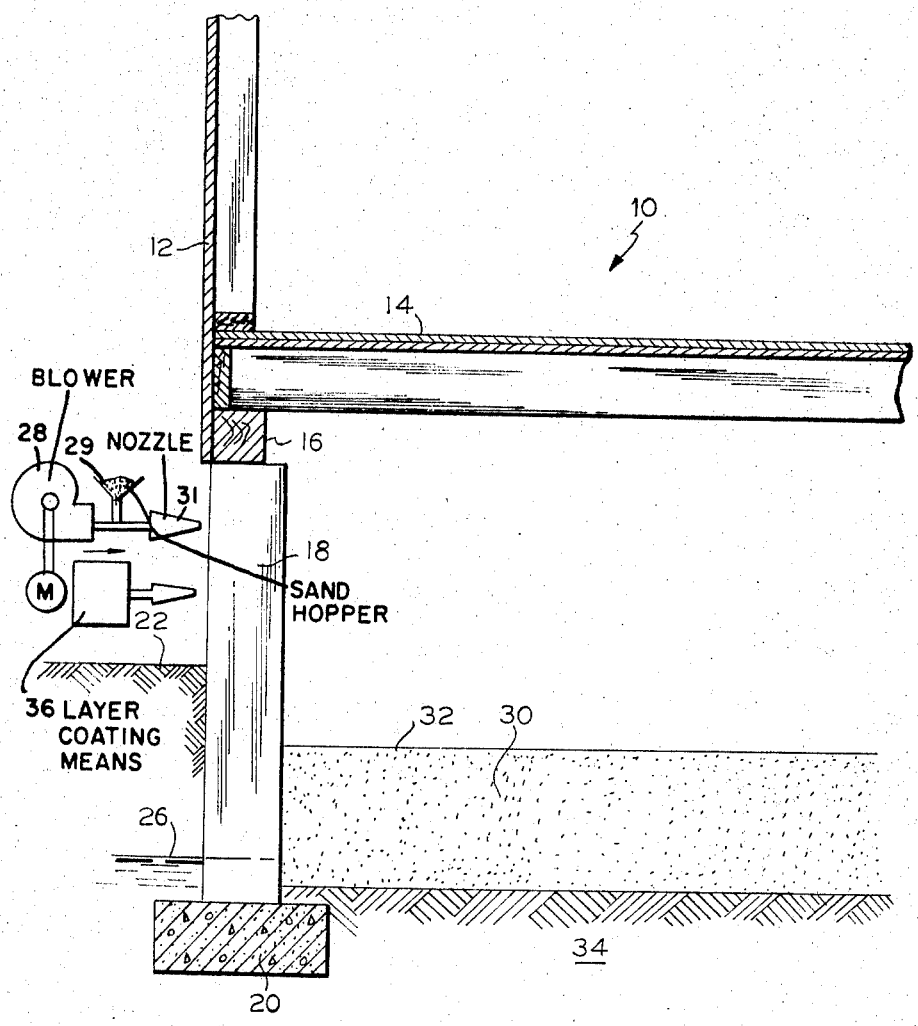
INVENTOR
CLARENCE L. STEVENS
BY
ATTORNEYS

WATER REPELLENT SAND

BACKGROUND OF THE INVENTION

The invention relates in general to a layer of water repellent sand placed in crawl spaces under houses or other edifices to provide a control space reducing moisture and providing a partial heat insulation means between the ground and the edifice, and more particularly the invention relates to the apparatus and the method of installing a layer of water repellent sand for moisture control in which the upper surface thereof extends essentially above the residual ground water level. In the process of practicing the invention, according to the bestmode thereof, masonry sand or any good quality of sand is blown into an essentially cleaned crawl space under houses or other edifices to a level having an upper surface above the residual ground water level, which is itself supported by the ground for earth support. Then a silicone resin diluted with mineral spirits is sprayed throughout and upon said upper surface of the masonry sand until the silicone resin permeates and soaks deeply throughout the sand for forming a coated particulate material. The sand is then dried for a period of about two days under normal atmospheric conditions of the Temperate Zone, so that there is formed a moisture repellent sand.

It has been a problem with houses built above the ground and having crawl spaces or control spaces between the lower flooring and the ground that decay fungi, moisture, vapor and condensation of moisture on the cold lower flooring, sills and joists occur when the outdoor environmental temperature is low. Various solutions have been suggested on ways to safeguard woodwork, metal and other structures used in modern houses constructed close to the ground, especially in low-rent housing developments, for preventing decay due to moisture that comes from the soil.

One of the methods as been to provide a clean control space between the lower flooring and the moisture in the ground by using untreated sand for soaking up water. This sand performs like a sponge and does not control the residual dampness, and the moisture moves up into the walls and wood resulting in rot, fruit spores and may cause asthmatic conditions in persons living within the housing. The excessive dampness causes hardwood floors to buckle and to deteriorate, and the wood eventually rots.

BRIEF SUMMARY OF THE INVENTION

It is found within the purview of the invention that if the ground, sand or residual material in the crawl space under the lower flooring of a house and between the joist and lowermost foundations of the house, even if moved below the water level, if it is within the footings of the foundation, regular masonry sand is blown by a blowing machine into the crawl space, and then the sand is spread out within the crawl space so that it is level and smooth, the sand is then built up to a level higher than the water level in the ground. Then there is sprayed a silicone resin or water-proofing material such as silicone resin mixed with mineral spirits in a ratio of 1:19 such as provided in the trademarked water repellant "Silicote," manufactured by American Paint Products Co., Inc., under the trademark "American Amo Lux." The silicone water-proofing is sprayed evenly on the sand. The mineral spirits in which the silicone resin is diluted is soaked up by the sand and thus carrying the silicone resin deep into the sand embodying the particulate matter of the sand with a layer of silicone resin. The sand is then smoothed over again and left to dry for about two days. When the sand has dried, it is water repellent and no water will rise in the sand from the residual ground water level through capillary action into the crawl space. Thus standing water is prevented from collecting under buildings, mildew is prevented as well as mold, musty odors, excessive sweaty windows, fungus on the wood structures, rot and decay of woodwork, warping of floors, buckling of the roof and other conditions caused by excessive moisture collecting under the building and permeating throughout the house structure. Thus the unhealthy, swamp-like conditions under a housing are thereby eliminated.

DETAILED DESCRIPTION OF THE DRAWINGS

The above and other objects and advantages of the invention will become apparent upon full consideration of the following detailed description and accompanying drawings in which:

The FIGURE shows a cut-away view of a house in which there is a layer of regular masonry sand having the particulate material thereof coated with a layer of silicone resin for moisture control and water repellent characteristics, and showing the moisture control that is provided by the practice of the invention in accordance with the preferred embodiment thereof.

DETAILED DESCRIPTION OF THE INVENTION

Referring now to the drawings there is shown a broken away view of a house 10 in which there is a wall 12, a joist 14, a sill 16, and a foundation wall 18 supported by a concrete foundation 20. The concrete foundation 20 in cases may be established below the water level in the ground. Between the joist 14 and the ground level 22, or some other level about a horizontal level to level 22 there is a crawl space found in many houses built on sand or moisture prevalent foundations. In some cases a water level in the ground could be shown as level 26.

In practicing the present invention, the crawl space area under the joist 14 may be cleaned out, whether necessary or not, and a blowing machine 28 may be used to blow regular masonry sand in a hopper 29 under the house 10 into the crawl space through a nozzle or outlet 31 under the building until it is level and smooth. The sand may be built up higher than the water level 26 in the ground in a case of water standing under the house or building.

The sand 30 may be filled to a level 32, all of which is supported by the earth support 34.

Over the sand 30 there is sprayed by a layer coating means 36 a mixture of silicone waterproofing that consists essentially of silicone resin diluted with mineral spirits. The silicone waterproofing material is soaked up by the sand carrying the silicone resin. The depth of soaking may be quite deep within the sand 30, and depends on the mixture of the silicone resin and the mineral spirits. In most cases, the silicone resin is 5 per cent of the mixture by weight and the mineral spirits is 95 per cent thereof.

The sand 30 after being spread with the silicone waterproofing material is smoothed over again and is left to dry for essentially about two days. When the sand dries it is water repellent, each particulate material of the sand being now coated with silicone resin and which provides that the capillary action of the sand is so reduced that no water will rise in the sand. The sand is water repellent and continues to stay dry.

It is important that the residual ground water level is covered by the sand which is blown in, as described above, and that the upper surface of the sand be essentially level and smooth throughout. The particulate material comprising the sand is each coated with a layer of silicone resin for eliminating and reducing the characteristics of capillary action of raising water toward the upper surface 32.

It is found that providing a crawl space in edifices and houses with the particulate sand being sprayed with a silicone resin water repellent material provides an insulation structure within the crawl space for eliminating heat loss when the ground is usually cool and damp.

Within the purview of the present invention and in accordance with the best mode thereof, it is seen that the prepared layer of sand is moisture repellent or water repellent, and the layer is provided to a depth which has its upper surface layer extending above the residual or average mean ground level, and which provides a partial heat insulation means between the ground and the edifice or main floor of the house.

Additional embodiments of the invention in this specification will occur to others and therefore it is intended that the true spirit of the invention be limited only by the appended claims and not by the embodiment described hereinabove. Accordingly, reference should be made to the following claims in determining the true spirit of the invention.

What is claimed is: edifice

1. Method comprising the steps of blowing sand into essentially cleaned crawl spaces under houses or other edifices to a level having an upper surface above the residual ground water level and being supported in bulk by a section of the ground for earth supports;

spraying a silicone resin diluted with mineral spirits throughout said upper surface until the silicone resin is soaked deeply throughout said sand for forming a coated particulate material; and drying the coated particulate material over a period of about two days to form moisture repellent sand, said coated particulate material forming an aggregate with all the other similar coated particulate material an insulating structure layer above the residual ground water level for eliminating heat loss into cool and damp ground.

2. Method of producing an earth supported layer of water repellent sand for moisture control comprising:

blowing masonry sand into a cavity in a crawl space under houses or other edifices to form a layer of masonry sand disposed in bulk over a section of ground for earth support, said layer having at least its upper surfaces extending above the residual ground water level, said upper surface being essentially level and smooth throughout;

layer-coating, such as by spraying, a silicone resin diluted with a mineral spirits base onto said masonry sand, said sand constituting particulate material in which each particle thereof is essentially coated with a layer of silicone resin to eliminate the characteristic of capillary action of raising water toward said upper surface; said layer of masonry sand thereby being water repellent and providing an insulation structure for moisture control.

* * * * *